United States Patent
Lee et al.

(10) Patent No.: US 10,262,322 B2
(45) Date of Patent: Apr. 16, 2019

(54) FINGERPRINT RECOGNITION CARD AND METHOD FOR OPERATING FINGERPRINT RECOGNITION CARD

(71) Applicant: KONA I CO., LTD., Seoul (KR)

(72) Inventors: Seung Gi Lee, Incheon (KR); Jung Bong Nam, Seoul (KR); Jung Haeng Jo, Seoul (KR)

(73) Assignee: KONA I CO., LTD., Seoul (KR)

( * ) Notice: Subject to any disclaimer, the term of this patent is extended or adjusted under 35 U.S.C. 154(b) by 57 days.

(21) Appl. No.: 15/390,163

(22) Filed: Dec. 23, 2016

(65) Prior Publication Data

US 2018/0108018 A1    Apr. 19, 2018

(30) Foreign Application Priority Data

Oct. 13, 2016 (KR) .......................... 10-2016-0133141

(51) Int. Cl.
  *G06K 9/00* (2006.01)
  *G06Q 20/40* (2012.01)
(52) U.S. Cl.
  CPC ... *G06Q 20/40145* (2013.01); *G06K 9/00013* (2013.01); *G06K 9/00087* (2013.01); *G06Q 20/4014* (2013.01)
(58) Field of Classification Search
  CPC ..... G06F 3/041; G06F 1/1613; G06Q 20/108; G06Q 40/02
  USPC ....... 382/115, 116, 124, 209, 278; 340/5.81, 340/5.82, 5.83
  See application file for complete search history.

(56) References Cited

U.S. PATENT DOCUMENTS

| | | | | |
|---|---|---|---|---|
| 6,942,147 B2* | 9/2005 | Lahteenmaki | ....... | G06K 7/0008 235/375 |
| 7,158,025 B2* | 1/2007 | Matoba | ................. | G08B 7/062 340/517 |
| 7,178,025 B2* | 2/2007 | Scheidt | .................. | G06F 21/31 705/67 |
| 7,424,134 B2* | 9/2008 | Chou | ................. | G07C 9/00087 340/5.82 |
| 7,778,935 B2* | 8/2010 | Colella | .................. | G06Q 20/04 235/380 |
| 7,917,769 B2* | 3/2011 | Campisi | ............. | G06K 9/00006 340/5.53 |

(Continued)

FOREIGN PATENT DOCUMENTS

CN     101447034 A    6/2009
CN     101639960 A    2/2010

(Continued)

Primary Examiner — Yosef Kassa
(74) Attorney, Agent, or Firm — Novick, Kim & Lee, PLLC; Sang Ho Lee

(57) ABSTRACT

A fingerprint recognition card includes a first region configured to receive power from a battery of the fingerprint recognition card, supply the power supplied from the battery to a second region in response to an input of a power button of the fingerprint recognition card, and control activation of a third region based on a fingerprint authentication result provided from the second region, the second region configured to be activated in response to the power supplied from the first region and include a fingerprint sensor configured to sense a fingerprint input by a user of the fingerprint recognition card and the third region configured to be activated based on the control of the first region.

18 Claims, 6 Drawing Sheets

(56) References Cited

U.S. PATENT DOCUMENTS

| | | | | |
|---|---|---|---|---|
| 8,270,816 B2* | 9/2012 | Mizushima | ............ | H04N 5/772 |
| | | | | 386/239 |
| 8,276,816 B2* | 10/2012 | Gardner | ............. | G06K 9/00026 |
| | | | | 235/380 |
| 8,904,187 B2 | 12/2014 | Saito et al. | | |
| 9,342,774 B1 | 5/2016 | Lin | | |
| 2015/0206148 A1 | 7/2015 | Cherry et al. | | |

FOREIGN PATENT DOCUMENTS

| | | |
|---|---|---|
| CN | 105825382 A | 8/2016 |
| JP | 2006-322186 A | 11/2006 |
| JP | 2010-44739 A | 2/2010 |
| JP | 2013-80474 A | 5/2013 |
| KR | 10-2011-0012101 A | 2/2011 |
| KR | 10-2016-0090633 A | 8/2016 |

* cited by examiner

FINGERPRINT RECOGNITION CARD AND METHOD FOR OPERATING FINGERPRINT RECOGNITION CARD

CROSS-REFERENCE TO RELATED APPLICATION

This application claims priority under 35 U.S.C. § 119 to Korean Patent Application No. 10-2016-0133141, filed Oct. 13, 2016, which is herein incorporated by reference in its entirety.

BACKGROUND

Embodiments of the inventive concepts described herein relate to a fingerprint recognition card and a method for operating the fingerprint recognition card.

Recently, with the development of various payment technologies which do not use physical money, methods for more simply performing payment service using a variety of means have been proposed. Since payment schemes purse convenience and require high security in a process of performing payment service, both of two aspects should be considered in proposing payment schemes.

Payment schemes using plastic cards are classically used. Users still prefer to use a basic payment scheme using a plastic card in recent years when a variety of payment means are developed. A payment scheme using a user terminal requires additional secure elements, whereas a payment scheme using a plastic card still approves payment without separate secure elements, thus fraud transaction on the plastic card cannot prevented if the plastic card is lost.

In addition, if a plastic card carried by the user is used as a variety of purposes as well as a payment task, resistance to separately carrying the plastic card may be reduced.

BRIEF SUMMARY

Embodiments of the inventive concepts provide a fingerprint recognition card for increasing payment security by including an additional security means in an on-board plastic card and a method for operating the fingerprint recognition card.

Embodiments of the inventive concepts provide a fingerprint recognition card including additional secure means embedded in the card for being used as stepwise secure means, and being used as a number of purposes and a method for operating the fingerprint recognition card.

Embodiments of the inventive concepts provide a fingerprint recognition card operated by using its own battery, selectively supplying power to only its specific region to minimize power consumption of the battery, and charging the battery via a conventional card reader, thus being permanently used and a method for operating the fingerprint recognition card.

According to an aspect of an embodiment, an on-board fingerprint recognition card may include a first region configured to receive power from a battery of the fingerprint recognition card, supply the power supplied from the battery to a second region in response to an input of a power button of the fingerprint recognition card, and control activation of a third region based on a fingerprint authentication result provided from the second region, the second region configured to be activated in response to the power supplied from the first region and include a fingerprint sensor configured to sense a fingerprint input by a user of the fingerprint recognition card and the third region configured to be activated based on the control of the first region.

In an aspect of an embodiment, the first region may include a card controller configured to control the first to third regions and a display unit configured to visually display at least one of whether the user is identified, a payment processing stage, whether payment is approved, and a one time password (OTP).

In an aspect of an embodiment, the third region may include a secure device configured to encrypt and store user identification information or card payment information and an antenna configured to communicate a signal between an external device and the secure device. For example, activation of whether the antenna is connected may be controlled based on control of the card controller.

In an aspect of an embodiment, the secure device may include a storage medium configured to store a plurality of applets. One of the plurality of applets may be activated based on control of the card controller.

In an aspect of an embodiment, the card controller may be configured to drive the one of the plurality of applets by selectively activating the third region irrespective of the fingerprint recognition result based on security level information of an external call command.

In an aspect of an embodiment, the secure device may be configured to display data received from the external device on the display unit by providing the data to the first region.

In an aspect of an embodiment, each of the second region and the third region may be deactivated, when a predetermined time elapses after each of the second region and the third region is activated.

In an aspect of an embodiment, the second region may further include an authentication controller configured to determine at least one of whether a fingerprint sensed by the fingerprint sensor is normally obtained, whether the sensed fingerprint is identical to previously stored authentication information, and a type of the obtained fingerprint and provide the fingerprint authentication result to the first region.

In an aspect of an embodiment, the card controller may be configured to activate the one of the plurality of applets based on the fingerprint type determined by the authentication controller.

In an aspect of an embodiment, the fingerprint recognition card may further include a contact part configured to receive external power and be in contact with the secure device and a charging circuit configured to charge the battery based on the external power supplied via the contact part.

According to another aspect of an embodiment, a method for using an on-board fingerprint recognition card having a battery and a fingerprint sensor may include supplying, by a control region, power from the battery to a fingerprint recognition region in response to an input of a power button of the fingerprint recognition card and activating, by the control region, the fingerprint recognition region, sensing, by the fingerprint sensor of the fingerprint recognition region, a fingerprint of a user of the fingerprint recognition card based on the supplied power, and comparing, by the control region, the sensed fingerprint with previously stored authentication information and controlling, by the control region, activation of a secure region.

In another aspect of an embodiment, the controlling of the activation of the secure region may include activating an applet of the secure region, if the sensed fingerprint is identical to the previously stored authentication information.

In another aspect of an embodiment, the method may further include determining, by the control region, to supply power to the fingerprint recognition region based on security level information of an external call command received in the control region. For example, the method may further include activating the applet of the secure region without supplying the power to the fingerprint recognition region, if a security level is low based on the security level information of the external call command.

In another aspect of an embodiment, the method may further include visually displaying at least one of whether the user is identified, a payment processing stage, whether payment is approved, and a OTP on a display unit of the fingerprint recognition card.

In another aspect of an embodiment, the method may further include deactivating the fingerprint recognition region or the secure region, when a predetermined time elapses after the fingerprint recognition region or the secure region is activated.

In another aspect of an embodiment, the sensing of the fingerprint of the user may include determining whether the fingerprint is normally obtained.

In another aspect of an embodiment, the controlling of the activation of the secure region may include determining a type of the obtained fingerprint and determining the activated applet based on the type of the obtained fingerprint.

In another aspect of an embodiment, the controlling of the activation of the secure region may include stopping operating the fingerprint recognition card, if the sensed fingerprint is not identical to the previously stored authentication greater than a predetermined number of times.

According to another aspect of an embodiment, a method may include a program for storing a medium to be executed by a computer.

According to another aspect of an embodiment, a computer-readable storage medium may store a program to be executed by a computer.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
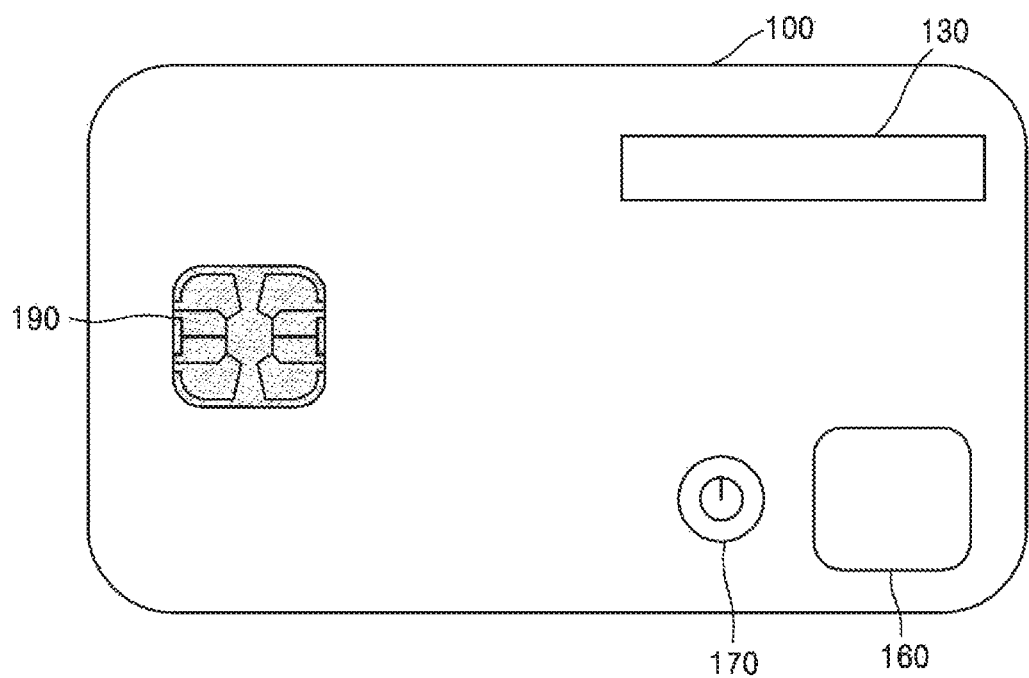
FIG. 1 is a drawing illustrating the appearance of a fingerprint recognition card according to an embodiment.

Hereinafter, a detailed description will be given of an exemplary embodiment of the inventive concept with reference to the accompanying drawings to clarify the scope and spirit of the inventive concept. In describing the inventive concept, if it is determined that a detailed description of related well-known functions or elements unnecessarily blurs the gist of the inventive concept, it will be omitted. The same reference numerals and denotations refer to the same elements having the substantially same function and configuration, although they are displayed on another drawing among the accompanying drawings.

FIG. 1 is a drawing illustrating the appearance of a fingerprint recognition card according to an embodiment.

Figure 2:
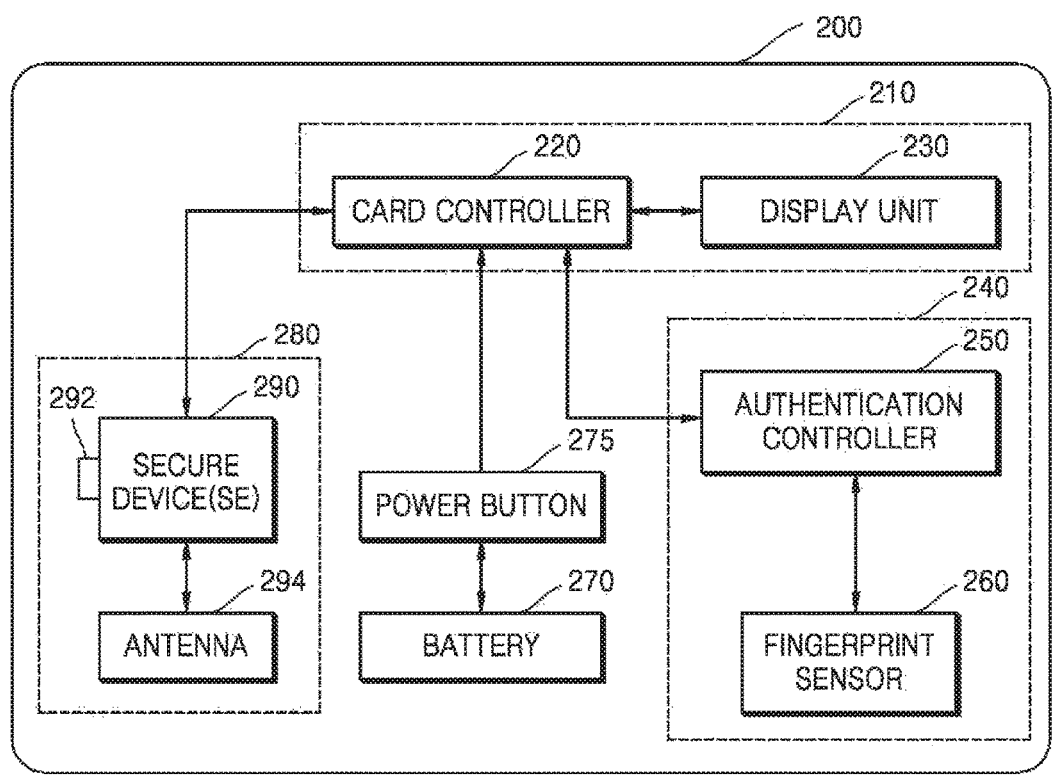
FIG. 2 is a block diagram illustrating a detailed configuration of a fingerprint recognition card according to an embodiment.

FIG. 2. is a block diagram illustrating a detailed configuration of a fingerprint recognition card according to an embodiment.

Referring to FIG. 1, when seen from the outside of a fingerprint recognition card 100 according to an embodiment, a display unit 130, a fingerprint sensor 160, a power button 170, and an integrated circuit (IC) chip 190 are shown.

An operation of the fingerprint recognition card 100 shown from the outside will be described. Detailed components which perform such operation will be described with reference to a fingerprint recognition card 200 of FIG. 2.

If recognizing a fingerprint of an authorized user of the fingerprint recognition card 100, the fingerprint recognition card 100 may provide payment information or user identification information stored in the IC chip 190 to perform an operation, such as card payment or user identification. The on-board fingerprint recognition card 100 may have its own battery. The power of the battery may be supplied to the fingerprint sensor 160 in response to an input of the power button 170, and the fingerprint sensor 160 may sense a fingerprint of a user of the fingerprint recognition card 100 based on the supplied power. For example, a partial region of the fingerprint recognition card 100 may always receive a small amount of power to recognize an input of the power button 170. Herein, the battery included in the fingerprint recognition card 100 may supply its power to only a minimum region and the battery may supply its power to the fingerprint recognition sensor 160 in response to an input of the power button 170, and the fingerprint sensor 160 may be activated by the supplied power.

The display 130 may visually output a variety of information which may be used when the fingerprint recognition card 100 is used. For example, the display unit 130 may include components, such as a monochrome or color liquid crystal display (LCD) and a light emitting diode (LED), which may visually display information. The display 130 may display information when the fingerprint recognition card 100 is powered on or off after the power button 170 is pushed, fingerprint verification information if a fingerprint is verified through fingerprint recognition, payment response information to a payment request, and one time password (OTP) information if an OTP is generated by itself or received from exterior.

FIG. 2. is a block diagram illustrating detailed components of a fingerprint recognition card 200. Referring to FIG. 2, the fingerprint recognition card 200 may include a first region 210, a second region 240, a third region 280, embedded battery 270, and a power button 275.

The first region 210 may include a card controller 220 and a display unit 230. The first region 210 may receive power from the battery 270 when the power button 275 is operated. The card controller 220 included in the first region 210 may be in a sleep state, may detect an input of the power button 275, and may supply power supplied from the battery 270 to the second region 240. The power button 275 may correspond to a power button 170 of FIG. 1. The first region 210 may control an overall operation of the fingerprint recognition card 200, thus being referred to as a control region.

The fingerprint recognition card 200 according to an embodiment hardly ever consume the power of the battery 270 in a situation where the power button 275 is not pushed. As the power button 275 is pushed, the first region 210 may wake up from the sleep state, may selectively supply power of the battery 270 to other regions, thus minimizing power consumption of the battery 270.

As an embodiment, the card controller 220 may store authentication information. The card controller 220 may receive fingerprint information detected by the second region 240 and may determine whether the fingerprint information is identical to the previously stored authentication information. As another embodiment, the card controller 220 may receive a determination result at an authentication controller 250 as a fingerprint is sensed, that is, information indicating whether a sensed fingerprint is identical to authentication information and may activate the third region 280 based on the determined result. According to an embodiment, the card controller 220 may control activation of the third region 280 based on a fingerprint authentication result provided from the second region 240. For example, the fingerprint authentication result is generated based on at least one of whether a fingerprint sensed by a fingerprint sensor 260 is normally obtained, whether the sensed fingerprint is identical to previously stored authentication information, and a type of the obtained fingerprint by the card controller 220 or the authentication controller 250

That the first region 210 activates the third region 280 may refer to that the first region 210 sends information stored in a secure device 290 included in the third region 280 to the exterior or that the first region 210 activates a specific apples of the secure device 290. That the first region 210 activates the third region 280 may be achieved in such a manner as to supply power to the third region 280 and in such a manner as to connect an antenna 294 of the third region 280 to the fingerprint recognition card 200 and activate a communication function.

The display unit 230 included in the first region 210 may display ON/OFF of the power button 275, may display whether a sensed fingerprint at the second region 240 is normally authenticated and whether the battery 270 is discharged, or may selectively display OTP information. The display unit 230 of FIG. 2 may correspond to a display unit 130 of FIG. 1.

The display unit 230 may display whether the power button 275 is turned ON/OFF and whether a sensed fingerprint is normally authenticated, based on information provided from the card controller 220. According to an embodiment, as information provided from an external OTP generation module is received via the third region 280 and is provided to the first region 210, OTP information may be displayed. In another embodiment, the secure device 290 of the third region 280 and the card controller 220 may generate OTP information itself.

The second region 240 may be activated in response to power of the battery 270 supplied via the first region 210 and may sense fingerprint information of a user of the fingerprint recognition card 200 via the fingerprint sensor 260. The fingerprint sensor 260 may correspond to a fingerprint sensor 160 of FIG. 1. The second region 240 may be referred to as a fingerprint recognition region.

According to an embodiment, the second region 240 may include the authentication controller 250. The authentication controller 250 compare fingerprint information sensed by the fingerprint sensor 260 with previously stored authentication information to determine whether a fingerprint of an authorized user of the fingerprint recognition card 200 is input. The authentication controller 250 may provide the determined result to the card controller 220 such that the card controller 220 activates another region (e.g., the third region 280) or such that the card controller 220 displays a fingerprint recognition result on the display unit 230.

According to an embodiment, the fingerprint recognition card 200 may manage fingerprint information of a plurality of fingers. The authentication controller 250 may determine whether information sensed by the fingerprint sensor 260 indicates a fingerprint of any finger. For example, the authentication controller 250 may determine whether a fingerprint sensed by the fingerprint sensor 260 is a fingerprint of a thumb or an index finger based on a characteristic of the thumb or the index finger and may provide information indicating whether the fingerprints are the same as each other and information about a type of the fingerprint together to the card controller 220 of the first region 210. The fingerprint information of the plurality of fingers may be managed by the card controller 220. The authentication controller 250 may communicate with the card controller 220 and may determine whether the sensed fingerprint is a fingerprint of any finger, that is the type of the fingerprint.

The card controller 220 may manage an input signal associated with a specific finger, that is, an input signal for activating a specific applet. As a fingerprint of the specific finger is input, the card controller 220 may provide the input signal associated with the specific finger to the third region 280. The third region 280 may perform a different applet based on the input signal received from the card controller 220. For example, the third region 280 may execute a different applet based on a type of an authenticated finger.

For example, the card controller 220 and the third region 280 may connect with each other through a plurality of connection lines. It may be understood that the card controller 220 provides different input signals to the third region 280 based on combinations of electric connections of the connection lines. If the card controller 220 and the third region 280 connect with each other using two connection lines, the card controller 220 may provide four different input signals to the third region 280 based on combinations of electric connections of the two connection lines such as '00', '01', '10', and '11'.

According to an embodiment, the authentication controller 250 may determine whether the sensed fingerprint information is normal fingerprint information or not. For example, if a number or more of feature points for specifying a fingerprint are not obtained from the sensed fingerprint information, the authentication controller 250 may determine that the sensed fingerprint information is abnormal fingerprint information. Also, a finger should be in contact with the fingerprint sensor 260 during a predetermined time or more to detect accurate fingerprint information. If the user removes contact with a finger within the predetermined time, the fingerprint authentication unit 250 may determine that fingerprint information is not normally obtained and may request the user to input fingerprint information again.

In another embodiment, the authentication controller 250 may display a start message to input a fingerprint to the fingerprint sensor 260, a completion message of the input of the fingerprint, and a requesting message of the user to input the fingerprint again, on the display unit 230. In this case, the authentication controller 250 may send information to be displayed on the display unit 230 to the card controller 220 of the first region 210. For example, the display unit 230 may display the message of 'Start' indicating start to input a fingerprint and the message of 'OK' if the sensing of fingerprint information is completed. The display unit 230 may display the message of 'RE-Start' indicating a request to input a fingerprint again if the fingerprint is not normally obtained.

Further, the result of comparing the fingerprint in the authentication controller 250 may be displayed to the user on the display unit 230. For example, if succeeding in authenticating a fingerprint as a result of authenticating the fingerprint, the authentication controller 250 may show character of 'PASS' on the display unit 230. If failing in authenticating the fingerprint, the authentication controller 250 may display the information of 'FAIL or Error' on the display unit 230.

As described above, the card controller 220 may provide a different input signal to the third region 280 based on a type of an authenticated finger or may perform a different operation itself.

The user may predict a next operation of the fingerprint recognition card 200 based on the result of comparing the fingerprint. Also, if a fingerprint is not normally authenticated, the user may attempt to input more accurate fingerprint information to the fingerprint sensor 260.

According to an embodiment, if authentication is not achieved although the fingerprint information is compared with the authentication information predetermined times, the card controller 220 may determine that an unauthorized user who stole the fingerprint recognition card 200 attempts to use the fingerprint recognition card 200 and the card controller 220 may inhibit an operation of the fingerprint recognition card 200. In this situation, for example, although the power button 275 of the fingerprint recognition card 200 is pressed, the card controller 220 may fail to activate the second region 240 and/or the third region 280.

If fingerprint information obtained via the fingerprint sensor 260 is identical to the previously stored authentication information, the card controller 220 may activate the third region 280.

In the specification, an embodiment is exemplified as the card controller 220 of the first region 210 and the authentication controller 250 of the second region 240 are independent of each other. However, embodiments are not limited thereto. For example, the card controller 220 and the authentication controller 250 may be implemented as one controller.

The third region 280 may be activated by receiving power from the battery 270 via the first region 210, or may be activated itself irrespective of whether power is received.

The third region 280 may include the secure device 290 and the antenna 294. The secure device 290 may store previously stored authentication information, card user information, user authentication information, and the like. According to an embodiment, the third region 280 may include a storage medium which stores a plurality of applets. The third region 280 may correspond to an IC chip 190 of FIG. 1. The third region 280 may be referred to as a secure region.

In addition, the secure device 290 may include an encryption module, may encrypt stored information or applets, and may store the encrypted information or applets. For example, the secure device 290 may include a secure element (SE). The SE may include a universal integrated circuit card (UICC), an embedded SE (eSE), and a micro secure digital (SD) card. The UICC may be used as the same meaning as a universal subscriber identity module (USIM) chip necessary when a mobile phone is opened. The eSE may refer to an element implemented in the form of attaching an SE to a main board of a device by an electronic device manufacturer. The micro SD card may be provided in the form of being attachable or detachable. For example, departing from influence of a mobile communication company, an institution which provides the micro SD card has ownership of the micro SD. The micro SD card may be made to provide a service through the ownership. The SE may be provided in the form of being separated from a central processing unit (CPU) which controls an operation of a device embedded with the SE. In addition, the SE operates its own encryption system, thus the device implementing with the SE become stronger with respect to attack from hacker, and thus high security is assured. Thus, activation of the secure device 290 may be controlled by the first region 210, but an internal operation of the secure device 290 may be performed by a control means of the secure device 290 itself.

The antenna 294 may include a conductive pattern printed on the on-board fingerprint recognition card 200 and may perform communication between an external device and the secure device 290. For example, if the third region 280 is activated, card payment information or user authentication information stored in the secure device 290 may be sent to an external payment gateway terminal, a payment gateway server, a user authentication device, or the like.

Further, the secure device 290 may request an external OTP generation module to generate an OTP via the antenna 294. For example, the secure device 290 may request the external OTP generation module to generate an OTP by sending user information to the external OTP generation module in a manner such as short range wireless communication. Receiving the OTP generated by the OTP generation module, the third region 280 may display the OTP information on the display unit 230.

According to an embodiment, the secure device 290 may store payment approval information, user authentication information, and OTP information received from an external device or may provide the received information to the first region 210. The first region 210 may display the information received from the external device on the display unit 230 such that the user uses the information.

The secure device 290 may perform various operations by performing different applets. The performance of these applets may be initiated based on a call command received from the exterior or by an input signal received from the card controller 220 or an input means included in the fingerprint recognition card 200. An operation according to the call command from the exterior will be described below with reference to FIGS. 5A and 5B. The initiation by the input means of the fingerprint recognition card 200 may refer to selecting an applet performed in the secure device 290 in response to a hard key and the like of the fingerprint recognition card 200. For example, user respectively presses different hard keys of the fingerprint recognition card 200 when the user wants to pay using the fingerprint recognition card 200, when he or she wants to use the fingerprint recognition card 200 as an identifier (ID) card, or when he or she wants to generate an OTP number. Also, as described above, the secure device 290 may receive a different input signal from the card controller 220 based on a type of a fingerprint input by the user and may execute a different applet based on the input signal.

The third region 280 may further include a contact part 292 which is in contact with the secure device 290. The contact part 292 may be electrically connected with an external card reader and the like, and may send an electric signal to the secure device 290.

According to an embodiment, if a time elapses after the second region 240 and the third region 280 are activated, each of the second region 240 and the third region 280 may automatically deactivated. An activation time maintaining the activation state of the second region 240 and the third region 280 may be the same or different from each other. The time may be counted by driving an internal timer. Also, since the first region 210 controls activation of each of the second region 240 and the third region 280, the first region 210 may check the time when each of the second region 240 and the third region 280 is activated and may deactivate the second region and/or the third region 280 if an activation time elapses.

As such, the fingerprint recognition card 200 may perform a fingerprint recognition operation and a display operation without external power while minimizing power consumption of the battery 270.

Meanwhile, although all of the power of the battery 270 is consumed, the user should be able to the fingerprint recognition card 200 continuously.

Figure 3:
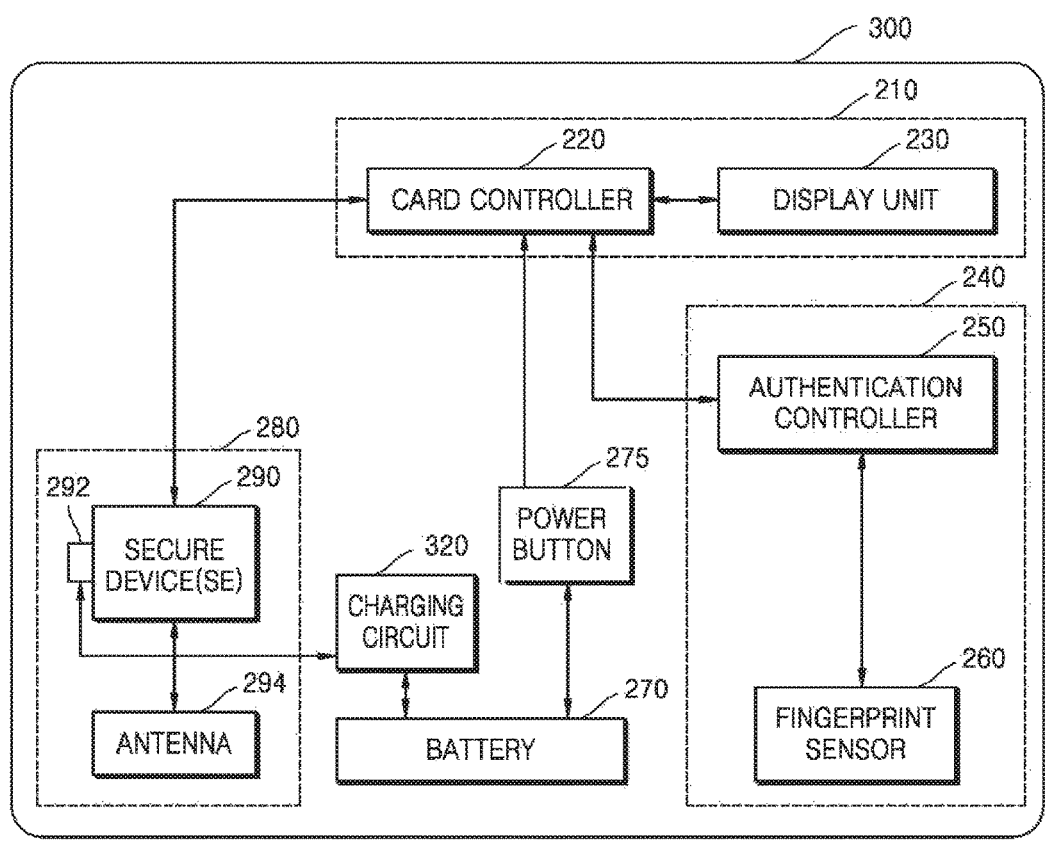
FIG. 3 is a block diagram illustrating a detailed configuration of a fingerprint recognition card according to an embodiment.

FIG. 3 is a block diagram illustrating a detailed configuration of a fingerprint recognition card according to an embodiment.

Compared with a fingerprint recognition card 200 of FIG. 2, a fingerprint recognition card 300 of FIG. 3 may further include a charging circuit 320. Since the same reference denotations refer to the substantially same components and have the substantially same configuration and operation, a detailed description will be omitted for convenience of description.

The charging circuit 320 may connect a battery 270 of the fingerprint recognition card 300 with a contact part 292 which is in contact with a secure device 290. A card reader may have a contact terminal which is in contact with the secure device 290 via the contact part 292. The fingerprint recognition card 300 according to an embodiment may receive current via the contact part 292 electrically connected with the card reader. Receiving the current, the charging circuit 320 may supply the current to the battery 270 to charge the battery 270.

As the fingerprint recognition card 300 has the above-mentioned charging circuit 320, although the battery 270 is discharged, the fingerprint recognition card 300 may easily charge the battery 270 via the card reader, thus extending its lifetime.

Figure 4:
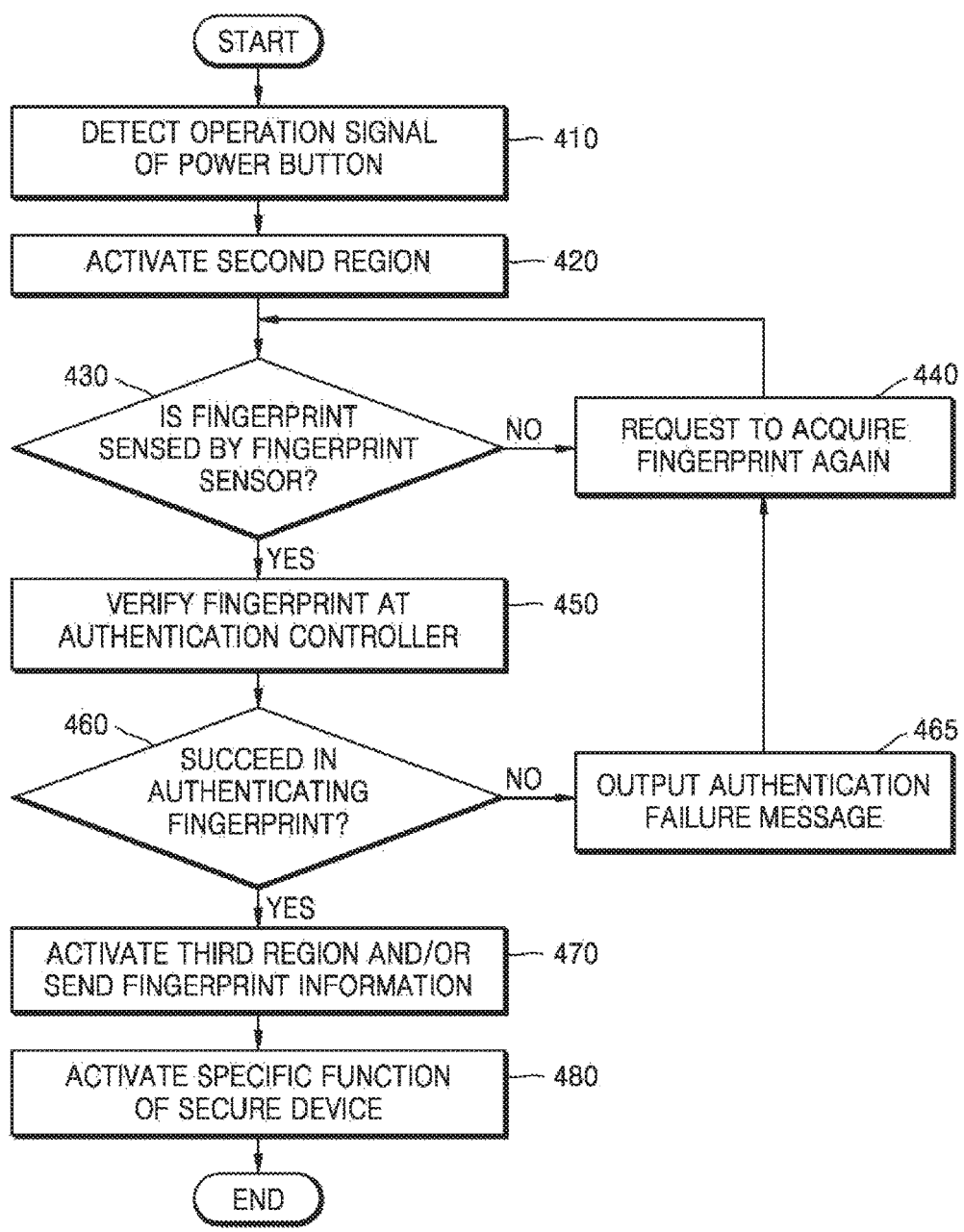
FIG. 4 is a flowchart illustrating a method for operating a fingerprint recognition card according to an embodiment.

FIG. 4 is a flowchart illustrating a method for operating a fingerprint recognition card according to an embodiment.

Referring to FIG. 4, in step 410, a card controller 220 of a first region 210 of FIG. 2 may detect an operation signal of a power button 275 of FIG. 2. In step 420, the card controller 220 of the first region 210 may activate a second region 240 of FIG. 2 by supplying power from a battery 270 of FIG. 2 to the second region 240 in response to an input of the power button 275.

A fingerprint of a user of a fingerprint recognition card 100, 200, or 300 of FIG. 1, 2, or 3 may be obtained by a fingerprint sensor 260 of the second region 240. If the fingerprint is normally sensed by the fingerprint sensor 260 in step 430 (see "YES"), in step 450, an authentication controller 250 of FIG. 2. may verify the fingerprint. According to an embodiment, the authentication controller 250 may compare the sensed fingerprint with previously stored authentication information to authenticate the fingerprint and may determine whether the sensed fingerprint is a fingerprint of any finger of the user, that is, determine a type of the fingerprint, thus verifying the fingerprint.

If the fingerprint is not normally sensed by the fingerprint sensor 260 in step 430 (see "NO"), in step 440, the authentication controller 250 may request to acquire a fingerprint again. As described above, the request to recognize the fingerprint again may be achieved by a method of displaying a message for requesting to acquire the fingerprint again on the display unit 230.

The result of authenticating the fingerprint in the authentication controller 250 may be provided to the card controller 220. The result of authenticating the fingerprint, provided from the authentication controller 250, may be generated by determining at least one of whether the fingerprint sensed by the fingerprint sensor 260 is normally obtained, whether the sensed fingerprint is identical to the previously stored authentication information, and a type of the obtained fingerprint.

If the authentication controller 250 succeeds in authenticating the fingerprint in step 460 (see "YES"), in step 470, the card controller 220 may activate a third region 280 of FIG. 2. While activating the third region 280, the card controller 220 may provide an input signal for activating a specific function of a secure device 290 of the third region 280 to the secure device 290. Also, as described above, in step 480, the secure device 290 may activate the specific function based on receiving a command from the exterior or an input through a hard key and the like implemented in the fingerprint recognition card 200.

According to an embodiment, in step 470, the card controller 220 may send fingerprint information to the third region 280. Encrypted information stored in the secure device 290 may be derived from the fingerprint information sent to the third region 280.

In step 480, the secure device 290 may activate the specific function based on a called command or a function selected in a fingerprint recognition card 100, 200, or 300. An operation of the secure device 290 may be performed based on the activated function. For example, the secure device 290 may perform operations of requesting to pay by the fingerprint recognition card 100, 200, or 300, generating an OTP number, and identifying the user.

If the authentication controller 250 fails in authenticating the fingerprint in step 460 (see "NO"), in step 465, the card controller 220 may output an authentication failure message on the display unit 230. In step 440, the card controller 220 may request to recognize the fingerprint again. According to an embodiment, if the authentication controller 250 fails in authenticating the fingerprint a number or more of times, the card controller 220 may stop an overall operation of the fingerprint recognition card 100, 200, or 300.

According to an embodiment, the card controller 220 may receive an external call command and may supply power to the second region 240 based on security level information included in the external call command, thus immediately activating the third region 280 without performing an operation of receiving a fingerprint and so on. This is because it is unnecessary to waste power in recognizing a fingerprint when a command with a low security level is executed.

If receiving a call command which is unnecessary to recognize a fingerprint, the card controller 220 may omit steps of activating the second region 240 and sensing fingerprint information after sensing an operation signal of the power button 275 and may immediately activate the third region 280. The card controller 220 may omit steps of sensing fingerprint information and may activate specific applets of the third region 280. In this case, the activated applets may be applets, each of which has a low security level.

Figure 5A:
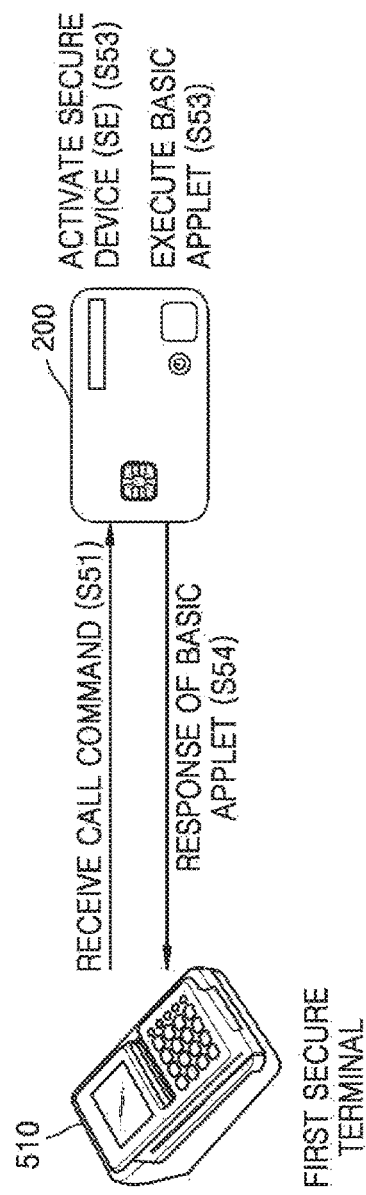
FIGS. 5A and 5B are drawings illustrating an operation of operating a fingerprint recognition card according to an embodiment.
Figure 5B:
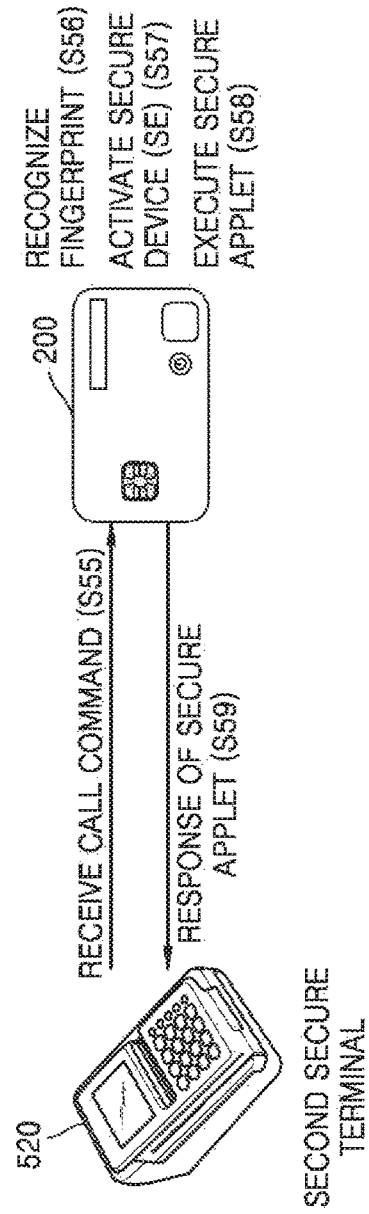

FIGS. 5A and 5B are drawings illustrating an operation of a fingerprint recognition card according to an embodiment.

FIGS. 5A and 5B illustrate a method for operating the fingerprint recognition card in a different way based on security level information of an external call command received in a card controller 220.

Referring to FIG. 5A, in step S51, a fingerprint recognition card 200 may receive a call command from a first secure terminal 510. In step S52, based on security level information included in the call command received from the first secure terminal 510, a card controller 220 of the fingerprint recognition card 200 may determine that it is unnecessary to recognize a fingerprint and verify the recognized fingerprint, and may activate a secure device 290 of a third region 280 of FIG. 2 without obtaining the fingerprint and comparing the fingerprint with the pre-stored authenticated fingerprint information. In step S53, the activated secure device 290 may execute a basic applet with a low security level. For example, if the fingerprint recognition card 200 is used as an identification certificate in an enterprise, a security level which is lower than a security level of authenticating a visitor through fingerprint recognition to enter the front gate of the enterprise may be set. As such, if the fingerprint recognition card 200 is used as a simple identification certificate, a fingerprint recognition process is skipped, thus reducing power consumption.

Referring to FIG. 5B, in step S55, the fingerprint recognition card 200 may receive a call command from a second secure terminal 520. In step S56, based on security level information included in the call command received from the second secure terminal 520, a card controller 220 of the fingerprint recognition card 200 may determine that it is necessary to recognize a fingerprint and verify the recognized fingerprint, and may activate a second region 240 of FIG. 2, thus recognizing the fingerprint.

In step S57, the card controller 220 may receive the result of comparing fingerprint information sensed by the second region 240 with previously stored authentication information and may activate the secure device 290 of the third region 280. According to an embodiment, the card controller 220 may receive a type of the authenticated fingerprint from the second region 240 and may provide a different input signal to the third region 280. In step S58, the secure device 290 may execute a specific applet based on at least one of the call command received in the card controller 220 and an input signal received in the third region 280. In this case, the executed applet may have a high security level, for example, may include an entrance identification applet for a laboratory or a system office which is requested to have high security.

As such, the fingerprint recognition card 200 and the method for operating the fingerprint recognition card 200 according to an embodiment may prevent an unauthorized user from using the fingerprint recognition card 200 by having the fingerprint sensor 260 and may control to supply power to a specific region to reduce power consumption of the battery 270. In addition, the fingerprint recognition card 200 and the method for operating the fingerprint recognition card 200 according to an embodiment may determine an operation with a low security level not to perform fingerprint recognition for the corresponding operation, such that the user uses the fingerprint recognition card 200 with flexibility.

Figure 6A:
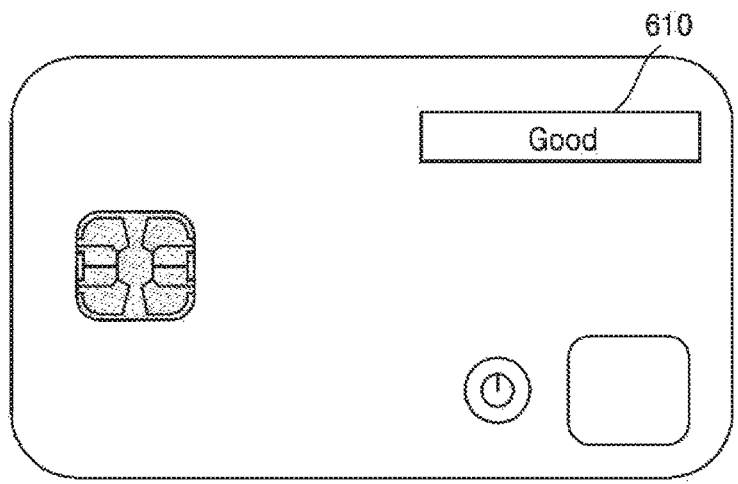
FIGS. 6A, 6B, and 6C are drawings illustrating an exemplary implementation of various operations of a display unit in a fingerprint recognition card according to an embodiment.
Figure 6B:
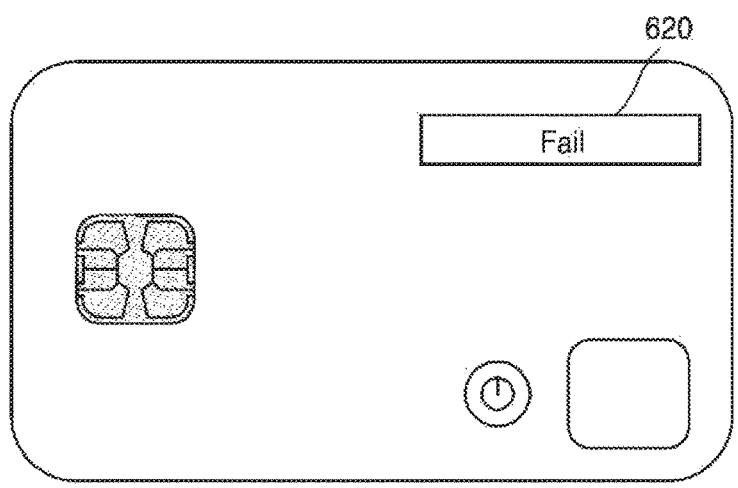
Figure 6C:
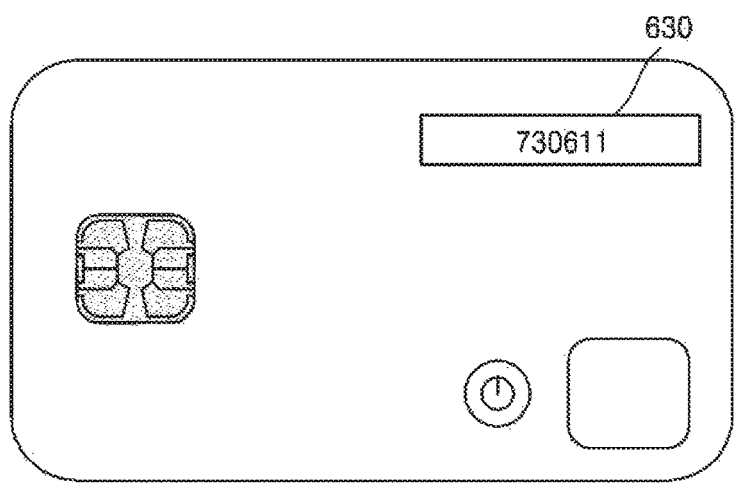

FIGS. 6A to 6C are drawings illustrating an exemplary implementation of various operations of a display unit in a fingerprint recognition card according to an embodiment.

Referring to FIG. 6A, if an authentication controller succeeds in verify a fingerprint of a user of a fingerprint recognition card 200 of FIG. 2, a display unit may display the information 'Good' 610 such that the user may check the success in recognizing the fingerprint. Referring to FIG. 6B, if the authentication controller fails in recognizing the fingerprint, the display unit may display the information 'Fail' 620 to guide the user to attempt to input his or her fingerprint again. Also, referring to FIG. 6C, if displaying OTP information, the display unit may display a six-digit number such as the information '730611' 630.

FIG. 6 illustrates a display operation of an exemplary display using the fingerprint recognition card 200. However, embodiments are not limited thereto.

According to an embodiment, the fingerprint recognition card may prevent unauthorized use although the fingerprint recognition card is stolen by including an additional secure means in an on-board plastic card.

According to an embodiment, the fingerprint recognition card may be used as a variety of ways based on an external call command or a type of a recognized fingerprint.

According to an embodiment, the fingerprint recognition card may use its own battery and may supply power to only its specific region based on its operation, thus minimizing consumption of the battery.

According to an embodiment, the fingerprint recognition card may charge its own battery via the contact part which is in contact with a card reader.

A detailed description is given about exemplary embodiments of the inventive concept shown in the accompanying drawings. Such embodiments are not limited to the inventive concept and are only exemplary, and should be considered in illustrative and not restrictive in terms of all aspects. The scope of the inventive concept shall be determined only according to the attached claims, rather than the above description. Although specific terms are used in the specification, such terms used herein are used for the purpose of describing the concept of the inventive concept only and are not used to be limited to the inventive concept or limit the scope of the inventive concept described in the attached claims. It should be understood to the ordinary skilled person in the art that the inventive concept is intended to cover various modifications and equivalent other embodiments within departing from the spirit and scope of the inventive concept. It should be understood that equivalents include equivalents to be developed in the future as well as currently well-known equivalents, that is, all elements invented to perform the same function irrespective of their structures.

What is claimed is:

1. An on-board fingerprint recognition card, comprising:
a control region receiving power from a battery of the fingerprint recognition card, supplying the power supplied from the battery to a fingerprint recognition region in response to an input of a power button of the fingerprint recognition card, and activating a secure region based on a fingerprint authentication result provided from the fingerprint recognition region;
the fingerprint recognition region being activated in response to the power supplied from the control region and including a fingerprint sensor sensing a fingerprint input by a user of the fingerprint recognition card; and
the secure region including a secure device encrypting and storing user identification information or card payment information, a contact part, and a charging circuit, the secure region being activated based on the power control of the control region in response to the fingerprint authentication result,
wherein the power supplied from the battery is sequentially provided to the fingerprint recognition region and the secure region based on control of the control region, and
wherein the contact part is connected with an external card reader and contacts with the secure device, sends an electric signal from the external card reader to the secure device, and receives a current from the external card reader to supply the current to the battery via the charging circuit.

2. The on-board fingerprint recognition card of claim 1, wherein the control region comprises:
a card controller controlling the control region, the fingerprint recognition region, and the secure region; and
a display unit visually displaying at least one of whether the user is identified, a payment processing stage, whether payment is approved, and an one time password (OTP).

3. The on-board fingerprint recognition card of claim 2, wherein the secure region further comprises:
an antenna communicating a signal between an external device and the secure device.

4. The on-board fingerprint recognition card of claim 3, wherein each of the fingerprint recognition region and the secure region is deactivated, when a predetermined time elapses after each of the fingerprint recognition region and the secure region is activated.

5. The on-board fingerprint recognition card of claim 2, wherein the secure device comprises:
a storage medium storing a plurality of applets, and
wherein one of the plurality of applets is activated based on control of the card controller.

6. The on-board fingerprint recognition card of claim 5, wherein the card controller drives the one of the plurality of applets by selectively activating the secure region irrespective of the fingerprint recognition result based on security level information of an external call command.

7. The on-board fingerprint recognition card of claim 5, wherein the fingerprint recognition region further comprises:
an authentication controller determining at least one of whether a fingerprint sensed by the fingerprint sensor is normally obtained, whether the sensed fingerprint is identical to previously stored authentication information, and a type of the obtained fingerprint and provide the fingerprint authentication result to the control region.

8. The on-board fingerprint recognition card of claim 7, wherein the card controller activates the one of the plurality of applets based on the fingerprint type determined by the authentication controller.

9. The on-board fingerprint recognition card of claim 1, wherein the secure device displays data received from the external device on the display unit by providing the data to the control region.

10. A method for operating an on-board fingerprint recognition card including a battery, a control region, a fingerprint recognition region including a fingerprint sensor, and a secure region including a secure device encrypting and storing user identification information or card payment information, a contact part, and a charging circuit, the method comprising:
supplying, by the control region, power from the battery to the fingerprint recognition region in response to an input of a power button of the fingerprint recognition card and activating, by the control region, the fingerprint recognition region;
sensing, by the fingerprint sensor of the fingerprint recognition region, a fingerprint of a user of the fingerprint recognition card based on the supplied power;
comparing, by the control region, the sensed fingerprint with previously stored authentication information to generate a fingerprint authentication result;
selectively supplying, by the control region, the power from the battery to activate the secure region in response to the fingerprint authentication result;
transferring, by the contact part, an electric signal from an external card reader to the secure device in contact with the contact part; and
charging the battery, by the charging circuit, based on a current from the external card reader via the contact part.

11. The method of claim 10, wherein the controlling of the activation of the secure region comprises:
activating an applet of the secure region, if the sensed fingerprint is identical to the previously stored authentication information.

12. The method of claim 11, further comprising:
determining, by the control region, to supply power to the fingerprint recognition region based on security level information of an external call command received in the control region.

13. The method of claim 12, further comprising:
activating the applet of the secure region without supplying the power to the fingerprint recognition region, if a security level is low based on the security level information of the external call command.

14. The method of claim 11, wherein the sensing of the fingerprint of the user comprises:
determining whether the fingerprint is normally obtained.

15. The method of claim 14, wherein the controlling of the activation of the secure region comprises:
determining a type of the obtained fingerprint; and
determining the activated applet based on the type of the obtained fingerprint.

16. The method of claim 11, wherein the controlling of the activation of the secure region comprises:
stopping operating the fingerprint recognition card, if the sensed fingerprint is not identical to the previously stored authentication greater than a predetermined number of times.

17. The method of claim 10, further comprising:
visually displaying at least one of whether the user is identified, a payment processing stage, whether payment is approved, and an OTP on a display unit of the fingerprint recognition card.

18. The method of claim 10, further comprising:
deactivating the fingerprint recognition region or the secure region, when a predetermined time elapses after the fingerprint recognition region or the secure region is activated.

* * * * *